(12) United States Patent
Chao et al.

(10) Patent No.: US 6,748,381 B1
(45) Date of Patent: Jun. 8, 2004

(54) APPARATUS AND METHOD FOR MAINTAINING CONSISTENCY OF SHARED DATA RESOURCES IN A CLUSTER ENVIRONMENT

(75) Inventors: Ching-Yun Chao, Austin, TX (US); Roger Eldred Hough, Austin, TX (US); Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,908

(22) Filed: Mar. 31, 1999

(51) Int. Cl.[7] .............................................. G06F 17/30
(52) U.S. Cl. ........................ 707/10; 707/201; 709/223; 709/213
(58) Field of Search ................................ 707/1–2, 9–10, 707/200–205; 709/221, 213, 223, 917, 244; 714/10–11, 13

(56) References Cited

U.S. PATENT DOCUMENTS

| | | | | |
|---|---|---|---|---|
| 5,787,247 A | * | 7/1998 | Norin et al. ................ 709/220 |
| 5,787,262 A | * | 7/1998 | Shakib et al. .............. 709/205 |
| 5,956,489 A | * | 9/1999 | San Andres et al. ........ 709/221 |
| 6,052,718 A | * | 4/2000 | Gifford ....................... 709/219 |
| 6,151,688 A | * | 11/2000 | Wipfel et al. ................ 714/48 |
| 6,163,855 A | * | 12/2000 | Shrivastava et al. .......... 714/4 |
| 6,192,417 B1 | * | 2/2001 | Block et al. ................ 709/249 |

* cited by examiner

Primary Examiner—Shahid Alam
Assistant Examiner—Jean Bolte Fleurantin
(74) Attorney, Agent, or Firm—Winstead Sechrest & Minick P.C.; Jeffrey S. LaBaw (57) ABSTRACT

A method and apparatus for providing a recent set of replicas for a cluster data resource within a cluster having a plurality of nodes; each of the nodes having a group services client with membership and voting services. The method broadcasts a data resource open request to the nodes of the cluster, determines a recent replica of the cluster data resource among the nodes, and distributes the recent replica to the nodes of the cluster. The apparatus is for providing a recent set of replicas for a cluster data resource. The apparatus has a cluster having a plurality of nodes in a peer relationship; each node has an electronic memory for storing a local replica of the cluster data resource. A group services client, which is executable by each node of the cluster, has cluster broadcasting and cluster voting capability. A database conflict resolution protocol ("DCRP"), which is executable by each node of the cluster, interacts with the group services clients such that the DCRP broadcasts to the nodes a data resource modification request having a data resource identifier and a timestamp. The DCRP determines a recent replica of the cluster data resource among the nodes with respect to the timestamp of the broadcast data resource modification request relative to a local timestamp associated with the data resource identifier, and distributes the recent replica of the cluster data resource to each node of the plurality of nodes.

17 Claims, 5 Drawing Sheets

APPARATUS AND METHOD FOR MAINTAINING CONSISTENCY OF SHARED DATA RESOURCES IN A CLUSTER ENVIRONMENT

CROSS REFERENCE TO RELATED APPLICATIONS

The present application is related to the following concurrently filed patent applications:

U.S. patent application Ser. No. 09/282,225, entitled "Apparatus and Method for Tracking Access to Data Resources in a Cluster Environment"; and U.S. patent application Ser. No. 09/282,907, entitled "Error Detection Protocol."

TECHNICAL FIELD

The present invention relates generally to distributed networks, and in particular to core cluster functions for maintaining consistency of shared data resources in a cluster environment.

BACKGROUND INFORMATION

As computer systems and networks become increasingly complex, the need to have high availability of these systems is becoming correspondingly important. Data networks, and especially the Internet, are uniting the world into a single global marketplace that never closes. Employees, sales representatives, and suppliers in far-flung regions need access to an enterprise network systems every hour of the day. Furthermore, increasingly sophisticated customers expect twenty-four hour sales and service from a Web site.

As a result, tremendous competitive pressure is placed on companies to keep their systems running continuously, and to be continuously available. With inordinate amounts of downtime, customers would likely take their business elsewhere, costing a company their goodwill and a revenue loss. Furthermore, there are costs associated with lost employee productivity, diverted, canceled, and deferred customer orders, and lost market share. In sum, network server outages can potentially cost big money.

In the past, companies have ran on a handful of computers executing relatively simple software. This made it easier to manage the systems and isolate problems.

But in the present networked computing environment, information systems can contain hundreds of interdependent servers and applications. Any failure in one of these components can cause of cascade of failures that could bring down your server and leave a user susceptible to monetary losses.

Generally, there are several levels of availability. The particular use of a software application typically dictates the level of availability needed. There are four general levels of systems availability: base-availability systems, high-availability systems, continuous-operations environments, and continuous-availability environments.

Base-availability systems are ready for immediate use, but will experience both planned and unplanned outages. Such systems are used for application development.

Second, high-availability systems include technologies that sharply reduce the number and duration of unplanned outages. Planned outages still occur, but the servers also includes facilities that reduce their impact. High-availability systems are used by stock trading applications.

Third, continuous-operations environments use special technologies to ensure that there are no planned outages for upgrades, backups, or other maintenance activities. Frequently, companies also use high-availability servers in these environments to reduce unplanned outages. Continuous-operations environments are used for Internet applications, such as Internet servers and e-mail applications.

Last, continuous-availability environments seek to ensure that there are no planned or unplanned outages. To achieve this level of availability, companies must use dual servers or clusters of redundant servers in which one servers automatically takes over if another server goes down. Continuous-availability environments are used in commerce and mission critical applications.

As network computing is being integrated more and more into the present commercial environment, the importance of having high availability for distributed systems on clusters of computer processors has been realized, especially for enterprises that run mission-critical applications. Networks with high availability characteristics have procedures within the cluster to deal with failures in the service groups, and make provisions for the failures. High availability means a computing configuration that recovers from failures and provides a better level of protection against system downtime than standard hardware and software alone.

Conventionally, the strategy for handling failures is through a failfast or failstop function. A computer module executed on a computer cluster is said to be failfast if it stops execution as soon as it detects a sever enough failure and if it has a small error latency. Such a strategy has reduced the possibility of cascaded failures due to a single failure occurrence.

Another strategy for handling system failures is through fault containment. Fault containment endeavors to place barriers between components so that an error or fault in one component would not cause a failure in another.

With respect to clusters, an increased need for high availability of ever increasing clusters is required. But growth in the size of these clusters increases the risk of failure within the cluster from many sources, such as hardware failures, program failures, resource exhaustion, operator or end-user errors, or any combination of these.

Up to now, high availability has been limited to hardware recovery in a cluster having only a handful of nodes. But hardware techniques are not enough to ensure high availability hardware recovery can compensate only for hardware failures, which accounts for only a fraction of the availability risk factors.

An example for providing high availability has been with software applications clustering support. This technique has implemented software techniques for shared system resources such as a shared disk and a communication protocol.

Another example for providing high availability has been with network systems clustering support. With systems clustering support, failover is initiated in the case of hardware failures such as the failure of a node or a network adapter.

Generally, a need exists for simplified and local management of shared resources such as databases, in which local copies of the resource is maintained at each member node of the cluster. Such efficient administrative functions aids the availability of the cluster and allows processor resources to be used for the execution and operation of software applications for a user.

SUMMARY OF THE INVENTION

Thus, provided herein is a method and apparatus for providing a recent set of replicas for a cluster data resource within a cluster having a plurality of nodes. Each of the nodes having a group services client with membership and voting services. The method of the present invention concerns broadcasting a data resource open request to the nodes of the cluster, determining the most recent replica of the cluster data resource among the nodes, and distributing the recent replica to the nodes of the cluster.

The apparatus of the present invention is for providing a recent set of replicas for a cluster data resource. The apparatus has a cluster having a plurality of nodes in a peer relationship, each node has an electronic memory for storing a local replica of the cluster data resource. A group services client, which is executable by each node of the cluster, has cluster broadcasting and cluster voting capability. A database conflict resolution protocol ("DCRP"), which is executable by each node of the cluster, interacts with the group services clients such that the DCRP broadcasts to the plurality of nodes a data resource modification request having a data resource identifier and a timestamp. The DCRP determines a recent replica of the cluster data resource among the nodes with respect to the timestamp of the broadcast data resource modification request relative to a local timestamp associated with the data resource identifier, and distributes the recent replica of the cluster data resource to each required node of the plurality of nodes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to a specific embodiment for a technique to provide an aspect of high-availability to a cluster, it should be understood that the present invention can be adapted for use with other high-availability techniques. All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Figure 1:
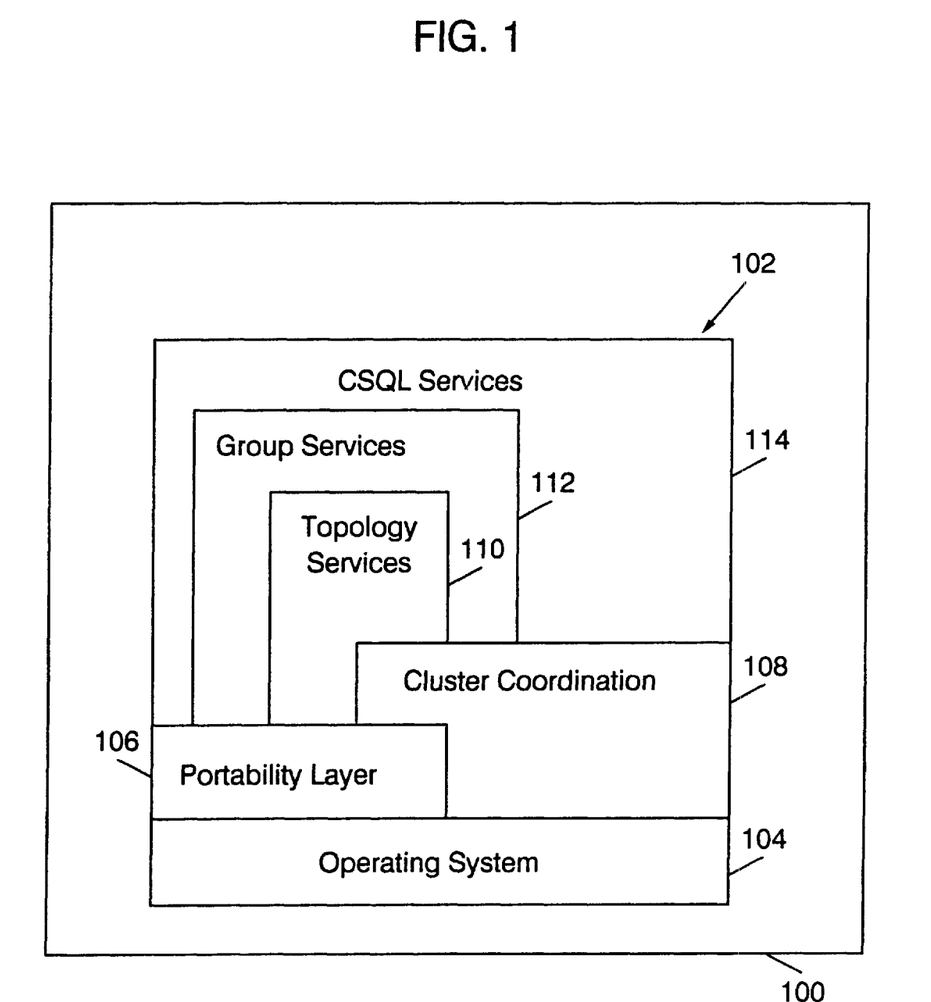
FIG. 1 is a block diagram representation of a computer used for providing a node in the cluster of the present invention.

Referring to FIG. 1, shown is a block diagram representation of a computer 100 used for providing a cluster of the present invention. The computer 100 has suitable hardware and operating system capabilities for providing networking capabilities for communication between different computers, or nodes, in a cluster 200. Each computer 100 used in the cluster has an executable core cluster software services component 102. The core cluster services software component 102 is a middle-ware layer having a set of executables and libraries that run on the resident operating system 104. The core cluster services is 32-bit and SMP ready. The core cluster services software component 102 has sub-components that include a portability layer 106, a cluster coordinator 108, a topology service 110, group services 112, and a Cluster Search Query Language ("CSQL") services 114.

The portability layer 106 provides a set of common functions used by the other components to access the resident operating system 104 while also masking operating system-dependent implementations, and functions relating to Reliability-Availability-Serviceability ("RAS") facilities such as tracing and logging of computer operations. The portability layer 106 in effect encapsulated operating-system dependent interfaces. Accordingly, the remaining sub-components of the core cluster services software component 102 may interact with the operating systems 104 without having to be structured to interact with the particulars of that operating system 104.

The cluster coordinator sub-component 108 provides software facilities for start-up, stop, and restart of the core cluster services 102. Each computer in the cluster has a cluster coordinator, but the individual cluster coordinators do not communicate with each other; the scope of each cluster coordinator sub-component 108 is restricted to the computer 100 on which it runs. The cluster coordinator sub-component 108 is executed first, and then it brings up the other core cluster services sub-components. Also, the cluster coordinator sub-component 108 monitors each of the other services, and restarts the core cluster services component 102 in the event of a failure.

The topology services sub-component 110 exchanges heartbeat messages with topology services in other computers. Heartbeat messages are used to determine which nodes of a cluster are active and running. Each of node of a cluster checks the heartbeat of its neighbor node. Through knowledge of the configuration of the cluster and alternate paths, the topology services sub-component 110 can determine if the loss of a heartbeat represents an adapter failure or a node failure. The topology services sub-component 110 maintains information about which nodes are reachable from other nodes, and this information is used to build a reliable messaging facility.

The group services sub-component, or client, 112 allows the formation of process groups containing processes on the same or different machines in the cluster. A process can join a group as a provider or a subscriber. Providers participate in protocol action on the group while subscribers are notified on changes to the state of the group or membership in the group. The group services client 112 supports notification on joins and departures of processes to a process group. The group services client 112 also supports a host group that can be subscribed to in order to obtain the status of all the nodes in the cluster. This status is a consistent view of the node status information maintained by the topology services sub-component 110.

With respect to the present invention, the group services client 112 provides cluster-aware functions to handle failure and reintegration of members in a process group. These functions are built on top of the reliable messaging facility being either atomic broadcast, or n-phase commit protocols.

The CSQL services sub-component 114 provides support for databases, which may contain configuration and status information. The CSQL services sub-component 114 can operate in stand-alone or cluster mode. The database of the CSQL services sub-component 114 is a distributed resource which, through the use of the group services client 112, is guaranteed to be coherent and highly available. Each database is replicated across all nodes and check pointed to disk so that changes are retained across reboots of the core cluster services 102. The CSQL services sub-component 114 serves or provides each cluster node with an identical copy of data.

Figure 2:
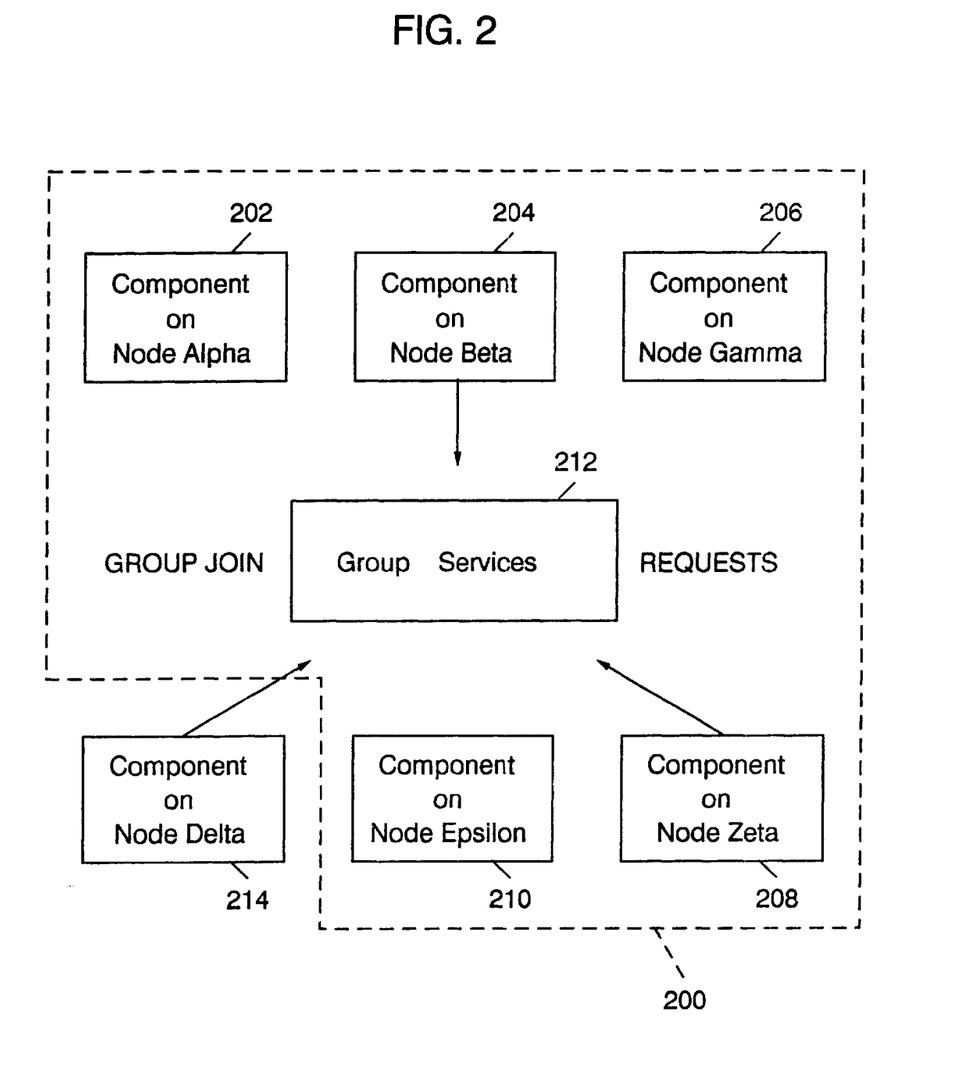
FIG. 2 is a block diagram representing a cluster having a plurality of nodes.

Referring to FIG. 2, shown is a block diagram representing a cluster 200. As an example, the cluster 200 represents an application with components operating on several nodes within the cluster 200. As shown, the cluster 200 has cluster nodes 202, 204, 206, 208, and 210 each executing a component of a software application. Each of the nodes is understood to be provided by a computer 100 as described in detail with respect to FIG. 1. Furthermore, each of the nodes 202, 204, 206, 208, and 210, are members of the cluster 200 because each have a group services client application 112, which collectively provide the group services 212 for the cluster 200.

The members are coordinated by the group services 212. Each of the cluster nodes 202, 204, 206, 208, and 210 have a core cluster services software component 102 with a group services client 112 (see FIG. 1), and each of these nodes are peers with respect to each other.

The group services 212 is formed by the combination of the group services sub-component 112 of the cluster nodes 202, 204, 206, 208, and 210. The term "client" as used herein means, on a network, a computer that accesses shared network resources provided by another computer.

The group services 212 can also support entities known as subscribers. These are cluster nodes that do not directly participate with the group members in planning and executing recovery actions, but are interested in recovery actions taken by the group members.

Accordingly, the group services 212 of the present invention provides updates that are real-time representations that are stored as a replica or copy on each of the cluster nodes. The group services 212 also provides cooperative processes to coordinate the maintenance and recovery activities across the cluster 200. An example of an addition of a member or subscriber is shown in FIG. 2, where an application component on node 214 seeks to become a member of the cluster node 200.

The inclusion of a node with respect to the present invention is a function of the shared resources of the cluster 200. For example, if the node 214 either lacks a data resource, such as a database, common to the other nodes of the cluster 200, or has an outdated database, the group services 212 coordinates the installation of a copy of the shared database.

Cluster functions are provided under an n-phase protocol. The n-phase protocol has a set of available votes, which for the present invention is the voting set of {CONTINUE, APPROVE, REJECT}. Each of the nodes participating in the cluster broadcasts a message having a header containing a VOTE field to convey the votes of the cluster nodes 202, 204, 206, 208, and 210, and membership seeking node 214. Such messaging formats are known to those skilled in the art. An n-phase refers to the n-series of broadcast/vote sequences generated by the members, or providers, of the cluster 200 to arrive at a consensus with respect to a proposed request.

Figure 3:
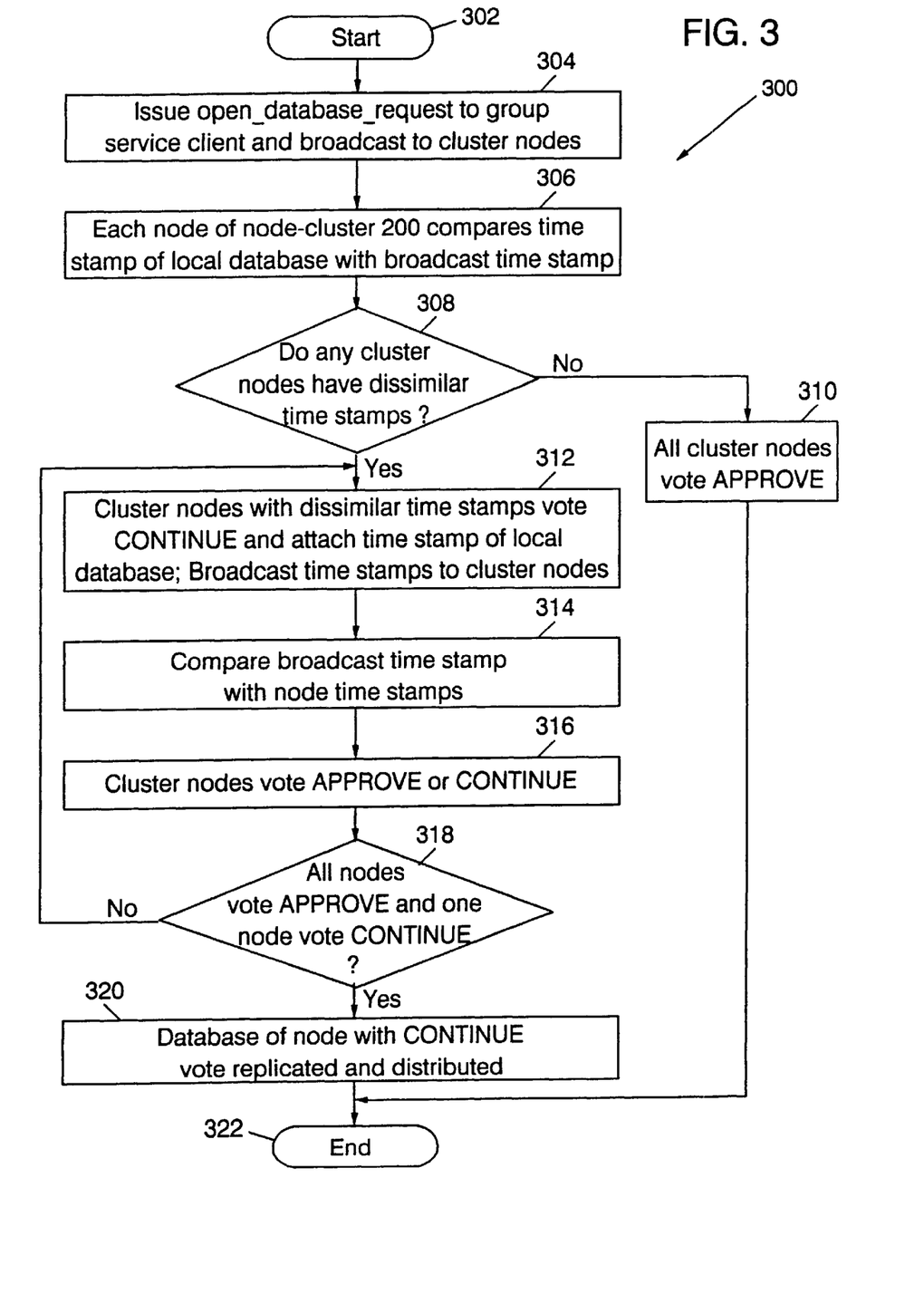
FIG. 3 is a flow chart of a database conflict resolution protocol ("DCRP") of the present invention executed by the nodes of the cluster.

FIG. 3 is a flow chart of a database conflict resolution protocol ("DCRP") 300 executed by the cluster node 200. The DCRP 300 ensures that system resources accessed by the nodes of the cluster 200 are recent and valid among the nodes 202, 204, 206, 208, 210, and 214. The DCRP 300 is used with respect to a cluster resource having a distinct identifier. In the present example, the DCRP 300 is described with regards to a database having a timestamp as the distinct resource identifier.

At step 302, the DCRP 300 is started and an open_data_resource request is issued to the group services 212 (see FIG. 2) at step 304 by one of the cluster nodes 202, 204, 206, 208, 210, or 214 (see FIG. 2). The open_data_resource request contains the name of the requested database, and a timestamp provided by the node with respect to the local database copy stored on the requesting node.

The timestamp has three components: a timestamp portion, a node identifier, and a cyclical redundancy check ("CRC"), also referred to as a checksum. The open_data_resource request is broadcast to the cluster nodes 202, 204, 206, 208, 210, and 214. The term "local" as used is an adjective describing a resource that is accessible by the cluster node at hand rather than remotely accessing another node for the information stored in the database. In this sense, the resources discussed herein are with respect to a distributed resource that stores information for the cluster 200 that is maintained for consistency through local copies of the database on each of the nodes of the cluster 200.

In general, checksums, or cyclic redundancy check values, may be maintained to better ensure database integrity. In the preferred embodiment, a single checksum for each database is maintained using an evaluation hierarchy from rows and columns to tables to the entire database. When a data item is updated, the checksum of the row and column containing the checksum is updated. Some forms of checksum permit merging of the values computed for each row and the values computed for each column and arriving at the same checksum across a database table through either method. Other forms of checksum computation require a choice of merging either the values for every row or the values for every column. The merging may consist of computing checksums across those for every row or column. Some form of merging is performed on the checksums of all tables within the database to obtain a checksum for the database.

The checksum of a database can be appended as a low-order component of the last modification time used to resolve which copy of a database will be used as the master image, or copy, across a cluster 200. This ensures that two different copies of the database having identical modification dates, especially when those dates are kept with a low-resolution timer, will not be mistaken for being the same copy of the database.

The checksum of a database can be included as part of the result for a database update request, ensuring that all members of the cluster observe the database change to exactly the same resulting state.

At step 306, each node of the cluster 200 compares the respective timestamp of the database copy at that node with the timestamp broadcasted in step 304. After the comparison at each of the cluster nodes, a determination is made at step 308 of whether any of the nodes have a differing timestamp from that broadcasted. If there are no differences, then each of the cluster nodes vote APPROVE—each of the cluster nodes have a recent database as specified by the open_data_resource request, and then access and use of the cluster resource, the cluster database in this example, proceeds at the exit, step 322, of the DCRP 300.

If there are differences between the local timestamps of the nodes and the broadcasted timestamp, then at step 312 the nodes having a different timestamp issue to the group services 212 (see FIG. 2) vote CONTINUE and attach with the vote the timestamp of the respective local database. Accordingly, a first phase of the communications protocol—with a broadcast from the group services 212 and a vote by the cluster nodes—has been completed.

With the occurrence of dissimilar timestamps, a second phase of the network communications protocol is entered where the votes by the dissenting cluster nodes are then broadcast to the cluster nodes. In step 314, the nodes make a comparison of the timestamps in a sequential manner. From the phases beyond the first phase, in step 316, a cluster node that receives its own timestamp must vote CONTINUE without sending out its timestamp again, a cluster node that receives the same or later timestamp must vote APPROVE, and a cluster node that receives an older timestamp must vote CONTINUE with its own timestamp. The algorithm will eventually converge when every node vote APPROVE and exactly one node vote CONTINUE with no message.

If at step 318, all the cluster nodes had voted APPROVE and one cluster node voted CONTINUE, then the DCRP 300 continues to step 320, where the local database of the node issuing the CONTINUE vote is replicated to the other cluster nodes. Prior to replicating the local database, a backup copy is created, and in step 322, the DCRP 300 exits.

But if in step 318 the condition does not exist where all nodes voted APPROVE and one node voted CONTINUE, then the DCRP 300 loops to step 312 to enter an additional phase of the communications protocol until the condition occurs. This condition occurs if more than one node has a database with a later timestamp than the previous nodes.

Accordingly, upon the condition where all the nodes voted APPROVE and one node voted CONTINUE, then in step 320 the database of the node having the CONTINUE vote is replicated and distributed to the other node members. Before the replicated database is accepted, each of the node members make a backup copy of its database version.

Figure 4:
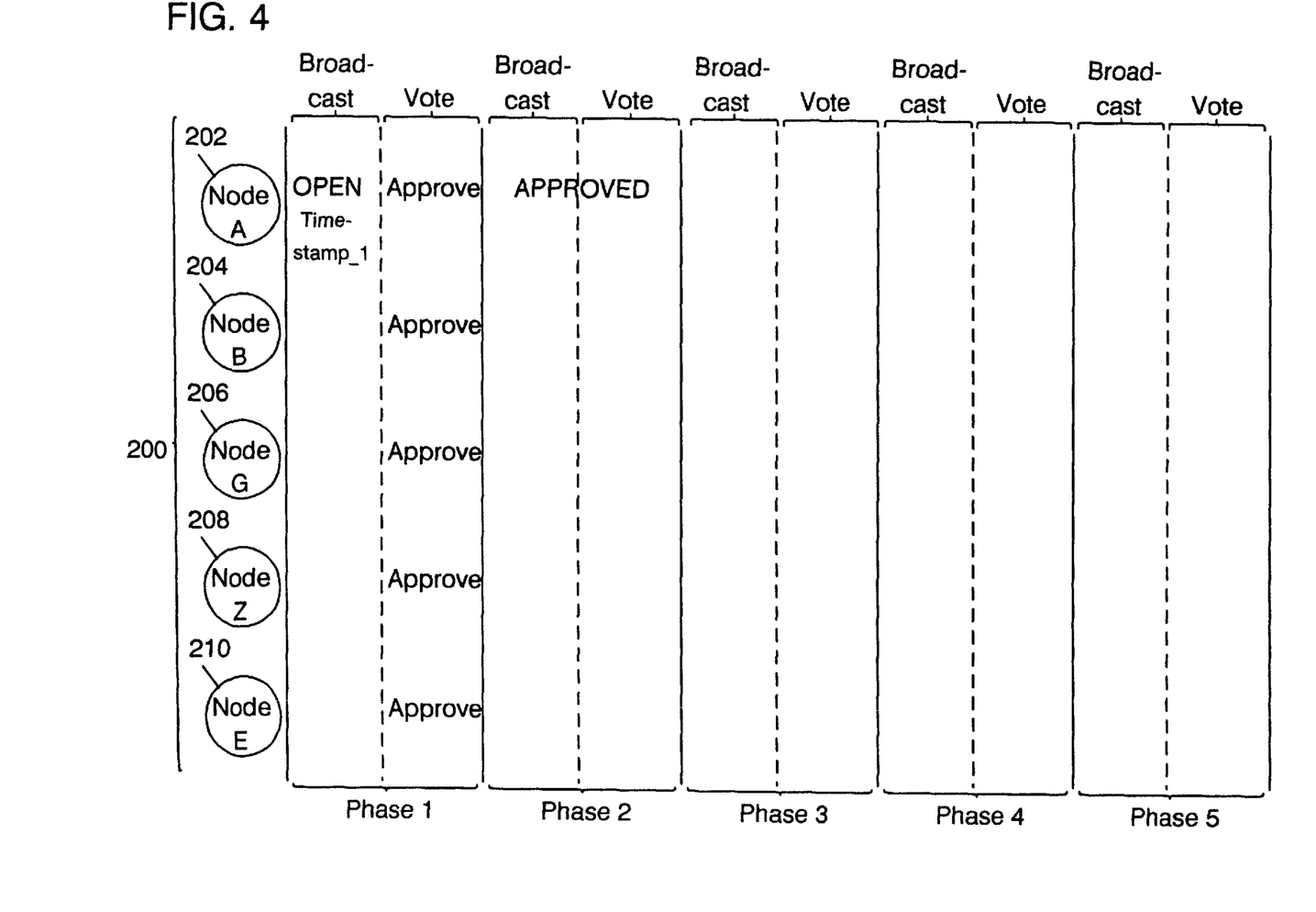
FIG. 4 is an example of the DCRP of the present invention applied with the member nodes of the cluster having the same timestamp for a shared data resource.

FIG. 4 is an example of the database conflict resolution protocol 300 applied when the member nodes have the same timestamp for a data resource.

As shown, NODE_A 202 issues an open_data_resource request for a database to the group service client, which in turn broadcasts the request, along with the timestamp time_stamp_1 of NODE_A 202 to the member nodes NODE_B 204, NODE_G 206, NODE_Z 208, and NODE_E 210 of the cluster 200. Each node of the cluster 200 compares the respective timestamp of the local data resource with the broadcasted timestamp time_stamp_1. Because the timestamps in this example are not dissimilar to time_stamp_1, each of the nodes vote APPROVE in the vote portion of Phase_1. In Phase_2, group services broadcasts APPROVED to the member nodes of the cluster 200.

Figure 5:
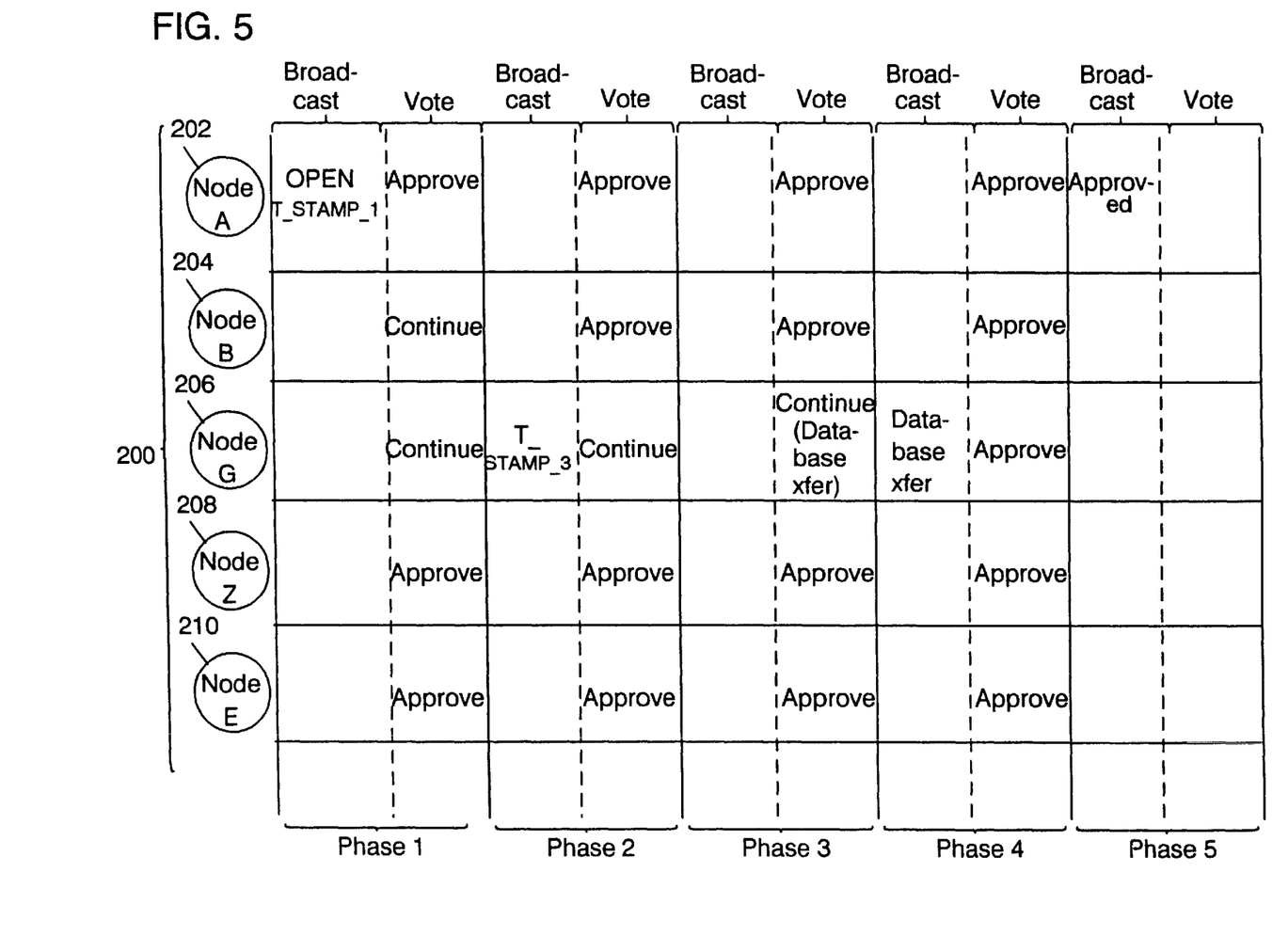
FIG. 5 is an example of the DCRP of the present invention applied when some of the member nodes have dissimilar timestamps for a shared data resource.

FIG. 5 is an example of the database conflict resolution protocol applied when some of the member nodes have dissimilar timestamps for a data resource. In this example, NODE_B 204 has a time_stamp_2 that is less than time_stamp_1, and NODE_G 206 has a time_stamp_3 that is greater than time_stamp_1.

As shown NODE_A 202 issues an open_data_resource request to the group service client, which in turn broadcasts the request, along with the timestamp time_time-stamp_1 of NODE_A 202 to the member nodes NODE_B 204, NODE_G 206, NODE_Z 208, and NODE_E 210 of the cluster 200. Each node of the cluster 200 compares the respective timestamp of the local data resource with the broadcasted timestamp time_stamp_1.

Because the NODE_A 202 received its own broadcasted timestamp, it must vote APPROVE in Phase_1. The NODE_Z 208, and the NODE_E 210 do not have dissimilar timestamps to time_stamp_1. Accordingly, each of these nodes vote APPROVE in Phase_1.

The NODE_B 204 and the NODE_G 206 each have dissimilar timestamps with respect to time_stamp_1. Accordingly, each node must vote CONTINUE and issue their respective timestamps time_stamp_2 and time_stamp_3 to the group service client to force a data resource replication. When multiple group services clients or each node votes with their timestamp in a given phase, the group services 212 will arbitrarily select one message and broadcast it to the group.

In Phase_2, the group services client broadcasts the later timestamp to the cluster nodes. In the present example, the later cluster node is time_stamp_3. Each of the nodes then vote on the timestamp. From Phase_2 on, a node that has a later timestamp than the one received must broadcast its timestamp and vote CONTINUE. Also, a node that receives it own timestamp must vote CONTINUE. Last, a node that has the same or earlier timestamp must vote APPROVE.

In the example of FIG. 5, each of the nodes have a timestamp that is earlier timestamp with respect to time_stamp_3, and votes APPROVE. Because the NODE_G 206 received its own timestamp, it votes CONTINUE in Phase_2.

Accordingly, only one CONTINUE vote at Phase_2 exists, with the remaining nodes vote being APPROVE. To indicate that a resolution has been obtained, the group service client does not broadcast a message in the following phase, which in this example is Phase_3. The node issuing the CONTINUE vote replicates its version of the data resource to the other member nodes, which is initiated in the vote portion of Phase_3.

With the group services client having the replicated data resource, it then broadcasts the data resource to the member nodes of the cluster 200. Upon receipt of the data resource, the nodes vote APPROVE in the vote portion of Phase_4. To indicate the consensus of a successful data resource transfer, the group services client broadcasts and APPROVED message to the member nodes of the cluster 200.

If a node joins a cluster 200 after a database is already opened and synchronized, the local replica of the database will be replaced by the group version regardless of the local timestamp for the database of the new cluster node.

An additional application of the DCRP 300 is to synchronize the configuration database for the cluster 200. In general, not all nodes start at the same time when a cluster is restarted. The collective of the group service clients provided by each cluster node can be in one of two states:

BIDDING and RUNNING. When the first group services client joins the cluster, it sets the group to a BIDDING state. The first group services client then starts a timer to wait for other group services clients to join in the cluster 200. Other group service clients that join also start a local time. When the first timer expires, that client broadcasts an OPEN request to open the configuration database. In general, after sufficient delay, enough clients, or nodes, will have joined the cluster and at least one node will have an up-to-date configuration database. After the DCRP 300 completes, the "winning" cluster node will set the group state to RUNNING.

When a node joins a group that is already in RUNNING state, it must replace its local replica by the version used by existing group members, provided that it has a different timestamp. It does not need to do anything if it has the same timestamp as the group's. The preferred way is to replicate the database to the new node via remote procedure call. Other possible ways include having an existing group member broadcast its replica to the group including the new node.

In effect, the database conflict resolution protocol provides an aspect of high availability in that each member node of a cluster is continuously afforded access to the latest version of a data resource, and synchronization between database versions—the local copies—at different nodes of the cluster 200.

Although the present invention and its advantages have been described in detail, it should be understood that various changes, substitutions and alterations can be made herein without departing from the spirit and scope of the invention as defined by the appended claims.

What is claimed is:

1. A method for providing a recent set of replicas for a cluster data resource within a cluster having a plurality of nodes each having a group services client with membership and voting services to the cluster, the method comprising the steps of:
    broadcasting to the plurality of nodes a data resource open request having a data resource identifier and a timestamp;
    determining a recent replica of the cluster data resource among the plurality of nodes with respect to the timestamp of the broadcast data resource open request relative to a local timestamp of a node of the plurality of nodes associated with the data resource identifier; and
    distributing the recent replica of the cluster data resource to each node of the plurality of nodes.

2. The method of claim 1 wherein the step of determining further comprises:
    determining relative to a local timestamp and a local checksum.

3. The method of claim 1 wherein the data resource open request is issued by the group services client of a node of the plurality of nodes in response to an application client executing on the node.

4. The method of claim 1 wherein the data resource open request is issued in a series of time intervals.

5. The method of claim 1 wherein the data resource open request is issued when an additional node joins the cluster.

6. The method of claim 1 wherein the step of determining further comprises the steps of:
    comparing the timestamp of the broadcast data resource open request relative to the local timestamp of a node of the plurality of nodes associated with the data resource identifier; and
    voting a comparison result to the plurality of nodes.

7. The method of claim 6, further comprising the step of:
    repeating the steps of comparing and voting until a favorable consensus is reached.

8. The method of claim 6 wherein the favorable consensus is an APPROVE vote by each node of the plurality of nodes.

9. The method of claim 6 wherein the favorable consensus is an APPROVE vote by all but one node of the plurality of nodes.

10. An apparatus for providing a recent set of replicas for a cluster data resource within a cluster having a plurality of nodes each having a group services client with membership and voting services to the cluster, the method comprising the steps of:
    means for broadcasting to said plurality of nodes a data resource open request having a data resource identifier and a timestamp;
    means for determining a recent replica of said cluster data resource among said plurality of nodes with respect to said timestamp of said broadcast data resource open request relative to a local timestamp of a node of the plurality of nodes associated with the data resource identifier; and
    means for distributing the recent replica of the cluster data resource to each node of the plurality of nodes.

11. The apparatus of claim 10 wherein the data resource open request is issued by the group services client of a node of the plurality of nodes in response to an application client executing on said node.

12. The apparatus of claim 10 wherein the data resource open request is issued according to a series of time intervals.

13. The apparatus of claim 10 wherein the data resource open request is issued when an additional node joins the cluster.

14. The apparatus of claim 10 wherein the determining means further comprise:
    means for comparing the timestamp of the broadcast data resource open request relative to the local timestamp of a node of the plurality of nodes associated with the data resource identifier; and
    means for voting a comparison result to the plurality of nodes.

15. An apparatus for providing a recent set of replicas for a cluster data resource, the apparatus comprising:
    a cluster having a plurality of nodes in a peer relationship, each node of said plurality of nodes having an electronic memory for storing a local replica of the cluster data resource,
    a group services client executable by each node of said plurality of nodes, said group services client having a cluster broadcasting and a cluster voting capability; and
    a database conflict resolution protocol ("DCRP") executable by each node of said plurality of nodes, said DCRP interacting with said group services clients such that said DCRP broadcasts to said plurality of nodes a data resource open request having a data resource identifier and a timestamp, determines a recent replica of said cluster data resource among said plurality of nodes with respect to said timestamp of said broadcast data resource open request relative to a local timestamp of a node of said plurality of nodes associated with said data resource identifier, and distributes said recent replica of said cluster data resource to each node of said plurality of nodes.

16. A method for establishing a consistent set of replicas of a database within a computer cluster using cluster membership and cluster voting services, comprising the steps of:

broadcasting an open request to other nodes to locate their corresponding replicas;

voting to select a most recently modified replica of the database;

determining through the voting of a source of the selected replica to be used by all participating nodes; and broadcasting the selected replica to participating nodes with differing or non-existent replicas;

wherein a most recently modified replica is determined using a timestamp;

wherein a checksum or cyclic redundancy value is used to further ensure consistency using the checksum or cyclic redundancy value as a low-order portion of the timestamp, and updating the checksum or cyclic redundancy value on each update of the database.

17. The method as recited in claim 16, wherein the checksum or cyclic redundancy value is computed using all data values within the database replica, but not including the timestamp of the last modification.

* * * * *